(12) United States Patent
Mullis et al.

(10) Patent No.: US 8,316,196 B1
(45) Date of Patent: Nov. 20, 2012

(54) SYSTEMS, METHODS AND COMPUTER READABLE MEDIA FOR IMPROVING SYNCHRONIZATION PERFORMANCE AFTER PARTIALLY COMPLETED WRITES

(75) Inventors: Samuel Mullis, Raleigh, NC (US); James Mark Holt, Raleigh, NC (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 656 days.

(21) Appl. No.: 12/242,725

(22) Filed: Sep. 30, 2008

(51) Int. Cl.
*G06F 12/00* (2006.01)

(52) U.S. Cl. .................. 711/162; 711/E12.001
(58) Field of Classification Search .......... None
See application file for complete search history.

(56) References Cited

U.S. PATENT DOCUMENTS

2003/0237019 A1* 12/2003 Kleiman et al. ............... 714/6
2006/0069890 A1* 3/2006 Cox et al. .................. 711/162

* cited by examiner

*Primary Examiner* — Charles Rones
*Assistant Examiner* — John P Fishburn
(74) *Attorney, Agent, or Firm* — Jenkins, Wilson, Taylor & Hunt, P.A.

(57) ABSTRACT

Systems, methods, and computer readable media for improving synchronization performance after partially completed writes are disclosed. According to one aspect, a method for improving synchronization performance after partially completed writes includes receiving, from a requesting entity, data to be written to storage. The data to be written is sent to each of a plurality of data storage entities, including a primary data storage entity and at least one secondary data storage entity for providing a duplicate of the primary data storage entity. For each of the plurality of data storage entities, the portion of the data that was stored to the respective data storage entity is determined. For each of the secondary data storage entities, the portions of the secondary data storage entity that do not contain a duplicate of the corresponding portion of the primary data storage entity are identified as requiring synchronization, while the portions of secondary data storage entity that contain a duplicate of the corresponding portion of the primary data storage entity are identified as not requiring synchronization.

24 Claims, 3 Drawing Sheets

SYSTEMS, METHODS AND COMPUTER READABLE MEDIA FOR IMPROVING SYNCHRONIZATION PERFORMANCE AFTER PARTIALLY COMPLETED WRITES

TECHNICAL FIELD

The subject matter described herein relates to computer and network data storage transactions. More particularly, the subject matter described herein relates to systems, methods, and computer readable media for improving synchronization performance after partially completed writes.

BACKGROUND

As computers in general, and personal computing devices in particular, become ubiquitous, networks and network service providers are called upon to provide data storage for increasing amounts of data. To accommodate the growing need for data storage, data storage systems must evolve to address competing requirements of increased capacity, faster access time, and failsafe mechanisms such as data backup.

One response to this demand for storage has been the development of data storage devices that behave as if they were a single storage device but are in reality multiple storage devices that collectively operate together. From the perspective of a host, i.e., an entity that makes demands to read, write and/or allocate data storage, these devices appear as a single data storage entity. Examples of such devices include disk storage arrays, network storage arrays, and the like.

A collection of data storage devices acting in concert may be configured to operate in a way that provides failsafe measures. For example, multiple disks may be organized into redundant arrays of inexpensive disks (RAID) groups. RAID groups may provide mirroring or other forms of duplication wherein data written to one disk is also written to another disk as a backup copy. RAID groups may also distribute data across many disks so that if one of the disks fails, there is enough data left on the other disks to reconstruct the missing data. RAID groups may perform a combination of striping and mirroring.

Using the simplest case, mirroring, from the host's perspective, the host is writing to just one device. In reality, however, the same data may be written to multiple devices. In conventional data storage systems, there is usually a controlling entity, such as a device driver, that acts as the intermediary between the host or hosts and the data storage devices. The controlling entity and the multiple data storage devices acting in concert is hereinafter collectively referred to as a data storage subsystem, or DSS.

A common problem that arises in systems that perform mirroring or other forms of backup or duplication is the problem of synchronization. Mirroring systems typically have at least two data storage entities, e.g., two disks, two RAID groups, etc., one to store the data and the other to store the backup copy of the data, commonly referred to as the primary and secondary data storage entities, respectively, or "primary" and "secondary" for brevity. In order to provide a backup copy of data, any data that is stored in the primary must also be stored in the secondary. The primary and secondary are said to be in synchronization with each other (also referred to "in sync") when the contents of the primary and secondary are the same, e.g., they match each other. If the contents of the primary and secondary do not match each other, the primary and secondary are said to be out of synchronization with each other (also referred to as "out of sync").

When a write request is sent from a host to a DSS, the DSS will attempt to write the data to both the primary and the secondary. If all of the data is successfully written to both the primary and the secondary, the host is informed that the write succeeded. Sometimes, however, some, but not all, of the data is written to a data storage device, a situation referred to as a "partial write" to that device. If both the primary and secondary were able to store only a portion of the data to be written, for example, the primary and secondary may still be in synchronization with each other despite the fact that a partial write occurred, so long as the primary and secondary both stored the same portion.

However, if all of the data is successfully written to the primary, but not all of the data was written to the secondary, the contents of the secondary do not match the contents of the primary, and the secondary is thus said to be out of synchronization with the primary. Conventional data storage subsystems respond to this situation in various ways.

In some conventional data storage systems, the host will be informed that the write failed. The host must then attempt to perform the write again until the data is successfully written to both the primary and the secondary. This is highly inefficient, since some or all of the data was successfully written to at least one of the data storage entities.

In some conventional data storage systems, the host will be informed that the write was successful, and a synchronization mechanism, separate from the host write, will copy the data from the primary to the secondary. This is an improvement on the method described above, because the host does not need to perform the write again just because the write to the secondary was not successful.

However, when only some of the data is successfully written to the primary—e.g., a partial write to the primary—these conventional storage systems may still exhibit other inefficiencies. For example, if only a portion of the data to be written was successfully stored on the primary, conventional data storage systems may indicate to the host that the write failed, requiring the host to retry until a full, rather than partial, write was performed on the primary. Even where a conventional data storage system allows a partial write to the primary, informing the host that the write was partially successful, for example, conventional data storage systems treat any data that happened to be successfully written to the secondary as invalid data. The synchronization mechanism will copy to the secondary whatever portion of the primary that was successfully (albeit partially) written, regardless of whether the data had already been written successfully to the secondary.

In one example, data to be stored to the data storage subsystem is represented by the string "ABCD", where each letter corresponds to a portion of the whole amount of data. If only a portion of the data, portion "ABC" for example, was successfully written to the primary, but all of the data was written to the secondary, conventional data storage subsystems may treat the data "ABCD" that was written to the secondary as invalid. A synchronization mechanism or process would then copy "ABC" from the primary to the secondary, despite the fact that the secondary already contained "ABC", and more (i.e., "D" also).

There are disadvantages associated with the conventional methods described above. First, the synchronization mechanism may be performing significant amounts of unnecessary copying (i.e., the "ABC" in the example above) from the primary to the secondary. This uses system resources, occupies data paths, and can cause delays in other storage functions while the synchronization process labors to synchronize the primary and secondary. These additional burdens placed on the system are collectively referred to as "overhead".

Second, this overhead, becomes increasingly burdensome as the amount of data stored on data storage subsystems grows. As users of computers and personal computing devices begin to expect access to songs, movies, and other multimedia formats, storage requirements will become very large. Extending the example above, hosts that formerly made write requests to store data "ABCD" may now desire to store data "ABCDEFGHIJKLMNOPQRSTUVWXYZ"; the larger the amount of data to be stored, the more likely it is that the data will be partially, rather than completely, stored on the primary. For example, if the primary was able to store A-Y, but the secondary was able to store A-Z, conventional DSSs will mark the entire portion of the secondary as being invalid and schedule the synchronizing process to copy A-Z from the primary to the secondary, even though the secondary already contains the correct data A-Y. Note that the secondary now contains Z that the primary does not, so the old Z must be copied from the primary to overwrite the new Z that was stored on the secondary. From this example it can be seen that enormous inefficiencies are associated with the conventional implementations of data storage subsystems. As additional secondaries are added to the DSS, so will the likelihood that additional synchronization write cycles will increase, thus increasing the inefficiencies.

Third, with the increased popularity of "sparse" data storage, where data storage space is virtually allocated to a host, application, or other entity but where actual storage space is not used until it is needed, an operation known as a "zero-fill write" (e.g., a SCSI WRITESAME with zero specified) becomes popular. Using a zero-fill write, large sections of data storage may be initialized, e.g., by filling the formerly unallocated or previously used space with zeroes. Unlike a normal write request, where the write request is accompanied by the data to be written, a zero-fill write request does not include data to be written: the data to be written is implicit in the request. Zero-fill writes are often used to initialize enormous portions of data storage. Because large portions of the primary are written with zeroes, equally large portions of one or more secondaries must also be synchronized. The inefficiencies described above may be multiplied by orders of magnitude due to the sheer size of a zero-fill write.

Accordingly, in light of these disadvantages associated with synchronization of data storage devices after the occurrence of a partially completed write, there exists a need for systems, methods, and computer readable media for improving synchronization performance after partially completed writes.

SUMMARY

According to one aspect, the subject matter described herein includes a method for improving synchronization performance after partially completed writes. The method includes receiving, from a requesting entity, data to be written to storage. The data to be stored is sent to each of multiple data storage entities, including a primary data storage entity and at least one secondary data storage entity that functions as a redundant backup for the primary data storage entity. At least some of the data is not completely written to all of the data storage entities. The method includes determining, for each of the data storage entities, which portion of the data was stored to the respective data storage entity, and identifying as requiring synchronization portions of each of secondary data storage entity that do not contain a duplicate of the corresponding portion of the primary data storage entity, and identifying as not requiring synchronization portions of each of secondary data storage entity that contain a duplicate of the corresponding portion of the primary data storage entity.

According to another aspect, the subject matter described herein includes a system for improving synchronization performance after partially completed writes. The system includes a primary data storage entity for storing data and a secondary data storage entity that functions as a redundant backup for the primary data storage entity. The system also includes a write controller for receiving, from a requesting entity, data to be written to storage, and sending the data to each of the primary and secondary data storage entities, wherein at least some of the data is not completely written to all of the data storage entities. The write controller determines, for each of the data storage entities, which portion of the data was stored to the respective data storage entity. The write controller identifies as requiring synchronization portions of the secondary data storage entity that do not contain a duplicate of the corresponding portion of the primary data storage entity, and identifying as not requiring synchronization portions of the secondary data storage entity that contain a duplicate of the corresponding portion of the primary data storage entity.

The subject matter described herein for improving synchronization performance after partially completed writes may be implemented in software in combination with hardware and/or firmware. As such, the terms "function" or "module" as used herein refer to software in combination with hardware and/or firmware for implementing the feature being described. In one exemplary implementation, the subject matter described herein may be implemented using a non-transitory computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for improving synchronization performance after partially completed writes. In one embodiment, internal synchronization of one or more secondaries is performed only for those portions of the respective secondary that do not contain the same data as the corresponding portion of the primary, rather than using the conventional technique of treating the secondary as being wholly out of synchronization with regard to the corresponding portions of the primary to which data was successfully written during the partially completed write.

Figure 1:
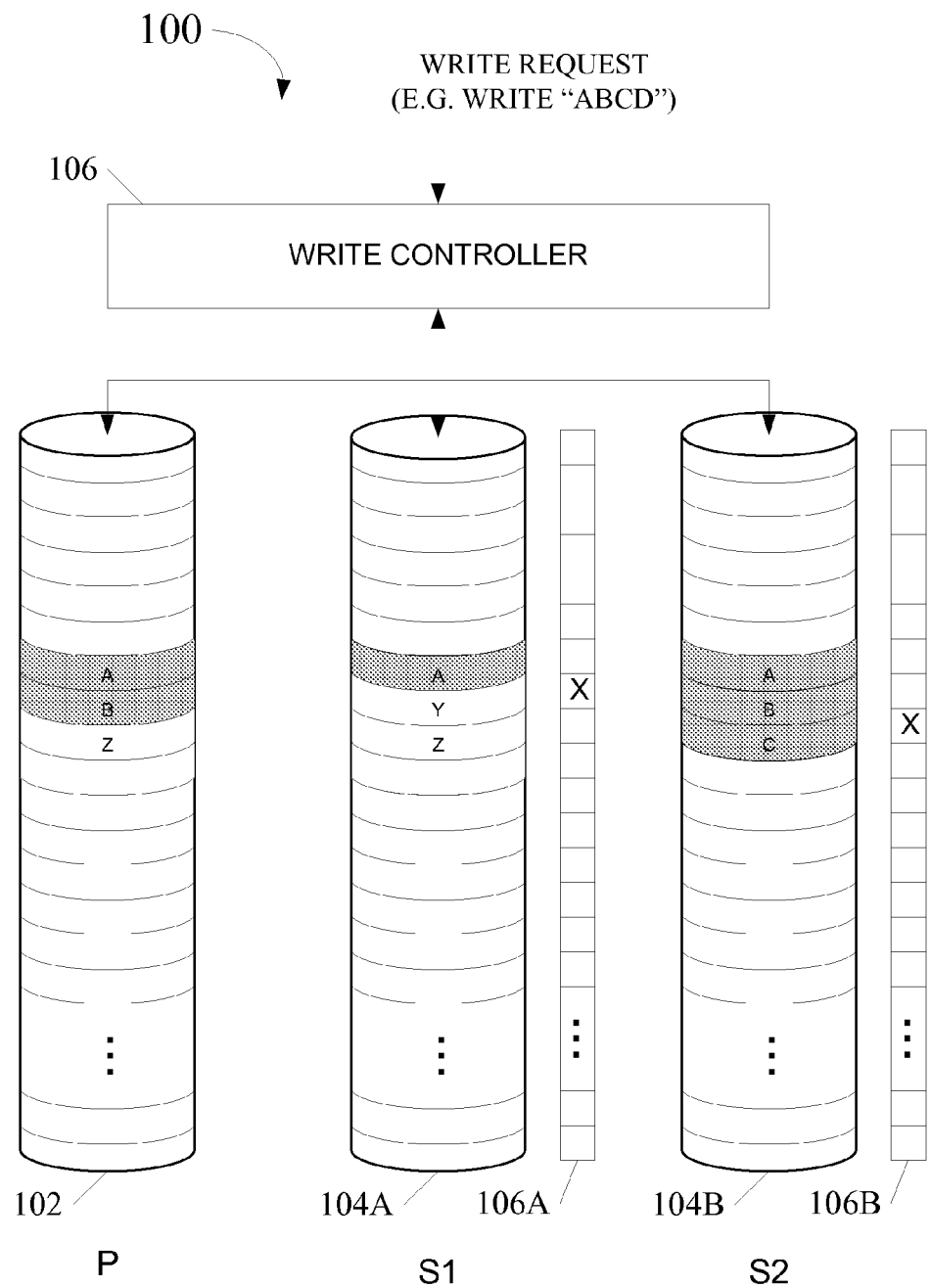
FIG. 1 is a block diagram illustrating a system for improving synchronization performance after partially completed writes according to an embodiment of the subject matter described herein.

FIG. 1 is a block diagram illustrating a system for improving synchronization performance after partially completed writes according to an embodiment of the subject matter described herein. System 100 includes a primary data storage entity (primary 102) for storage data and one or more secondary data storage entities (secondary 104) that function as a redundant backup for primary 102. In the embodiment illustrated in FIG. 1, system 100 includes two secondary data storage entities 104A and 104B, collectively referred to as secondary/secondaries 104.

A write controller 106 receives, from a requesting entity, data to be written to storage, and sends the data to each of the primary and secondary data storage entities 102 and 104, where at least some of the data is not completely written to all of the data storage entities. Data may be included with the write request explicitly, i.e., "write data (ABCD) to storage", or implicitly, i.e., "write a zero-fill block of 1,000 bytes". Write controller 106 determines, for each of the data storage entities 102 and 104, which portion of the data was stored to the respective data storage entity. Portions of secondary data storage entity or entities 104 that do not contain a duplicate of the corresponding portion of the primary data storage entity 102 are identified by write controller 106 as requiring synchronization, and portions of the secondary data storage entity or entities 104 that contain a duplicate of the corresponding portion of the primary data storage entity 102 are identified by write controller 106 as not requiring synchronization.

In one embodiment, write controller 106 may synchronize the portions of the secondary data storage entity identified as requiring synchronization. In an alternative embodiment, the synchronization process may be performed by another entity within system 100 for monitoring the identified portions of secondaries 104. In one embodiment, synchronization of a secondary data storage entity to a primary data storage entity involves copying data from at least a portion of the primary data storage entity to the corresponding portion or portions of the secondary data storage entity.

In one embodiment, system 100 may include a bitmap 108 for indicating the portions of a secondary 104 that require synchronization. In the embodiment illustrated in FIG. 1, write controller 106 maintains a separate bitmap for each secondary, bitmaps 108A and 108B, respectively. Each bit in the bitmap corresponds to a portion of the respective data storage entity. For example, secondaries 104 may be divided into N portions, in which case bitmaps 108 may have N bits each, where one bit corresponds to one portion of the secondary, and the value of the bit in the bitmap indicate whether the portion of the secondary associated with that bit requires synchronization (i.e., is out of sync with the primary) or does not require synchronization (i.e., is in sync with the primary). For example, a bit value of "1" may indicate that the portion of the secondary associated with that bit is out of sync with the corresponding portion of the primary, while a bit value of "0" may indicate that the portion of the secondary is in sync with the corresponding portion of the primary.

In one embodiment, write controller 106 may identify portions of secondaries 104 as requiring synchronization by sending the data to be written to each data storage entity and monitoring each entity's responses to determine how much of the data was successfully written to the respective data storage entity. Write controller 106 may then compare the amounts of data written to identify which portion of each secondary 104 is out of synchronization with the primary.

For example, if write controller 106 sends 32 kilobytes of data to be written to each of primary 102 and secondaries 104A and 104B, represented as four 8-kilobyte chunks labeled "A" through "D", and receives responses indicating that primary 102 was able to write 16 kilobytes of data, secondary 104A was able to write 8 kilobytes of data, and secondary 104B was able to write 24 kilobytes of data, write controller 106 can determine which portions of secondaries 104A and 104B are out of sync with primary 102. Referring to FIG. 1, write controller 106 may determine that kilobytes 1~8 (portion "A") of secondary 104A are in sync with primary 102 but kilobytes 9~16 of secondary 104A (portion "B") are out of sync with primary 102, since kilobytes 9~16 still contain old data while the corresponding portion of primary 102 contains newly written data. Write controller 106 would then flag portion B of secondary 104A as requiring synchronization, and set the bits in the bitmap associated with secondary 104A accordingly. During synchronization, kilobytes 9~16 of primary 102 would be copied to kilobytes 9~16 of secondary 104A. Upon completion of the synchronization process, the bits corresponding to kilobytes 9~16 in the bitmap associated with secondary 104A would be cleared. Note that as used herein, the terms "set a bit" and "clear a bit" may, but do not exclusively, refer to the use of a bit value of "1" and "0", respectively. For example, a bitmap bit value of "0" may be used to indicate a need to synchronize the corresponding portion of the secondary and a value of "1" may be used to indicate the opposite.

By a similar process, write controller 106 may determine that kilobytes 1~16 (portions "A" and "B") of secondary 104B are in sync with primary 102, but kilobytes 17~24 (portion "C") of secondary 104B have newer data that did not make it onto primary 102 and are thus out of sync with primary 102. Write controller 106 may then flag kilobytes 17~24 of secondary 104B as requiring synchronization, and set the bits in the bitmap associated with secondary 104B accordingly. During synchronization, kilobytes 17~24 of primary 102 would be copied to kilobytes 17·24 of secondary 104B, thus the older data on primary 102 would overwrite the newly written data on secondary 104B, at least for that portion. Upon completion of the synchronization process, the bits corresponding to kilobytes 17~24 in the bitmap associated with secondary 104B would be cleared.

The end result of the synchronization processes is that secondaries 104 would contain exact duplicates of primary 102. In some cases, newer data from the primary must be copied to the secondary, and in other cases, older data from the primary must be copied to the secondary. Thus, in one embodiment, secondaries 104 are modified to match the primary 102, but not the reverse.

Figure 2:
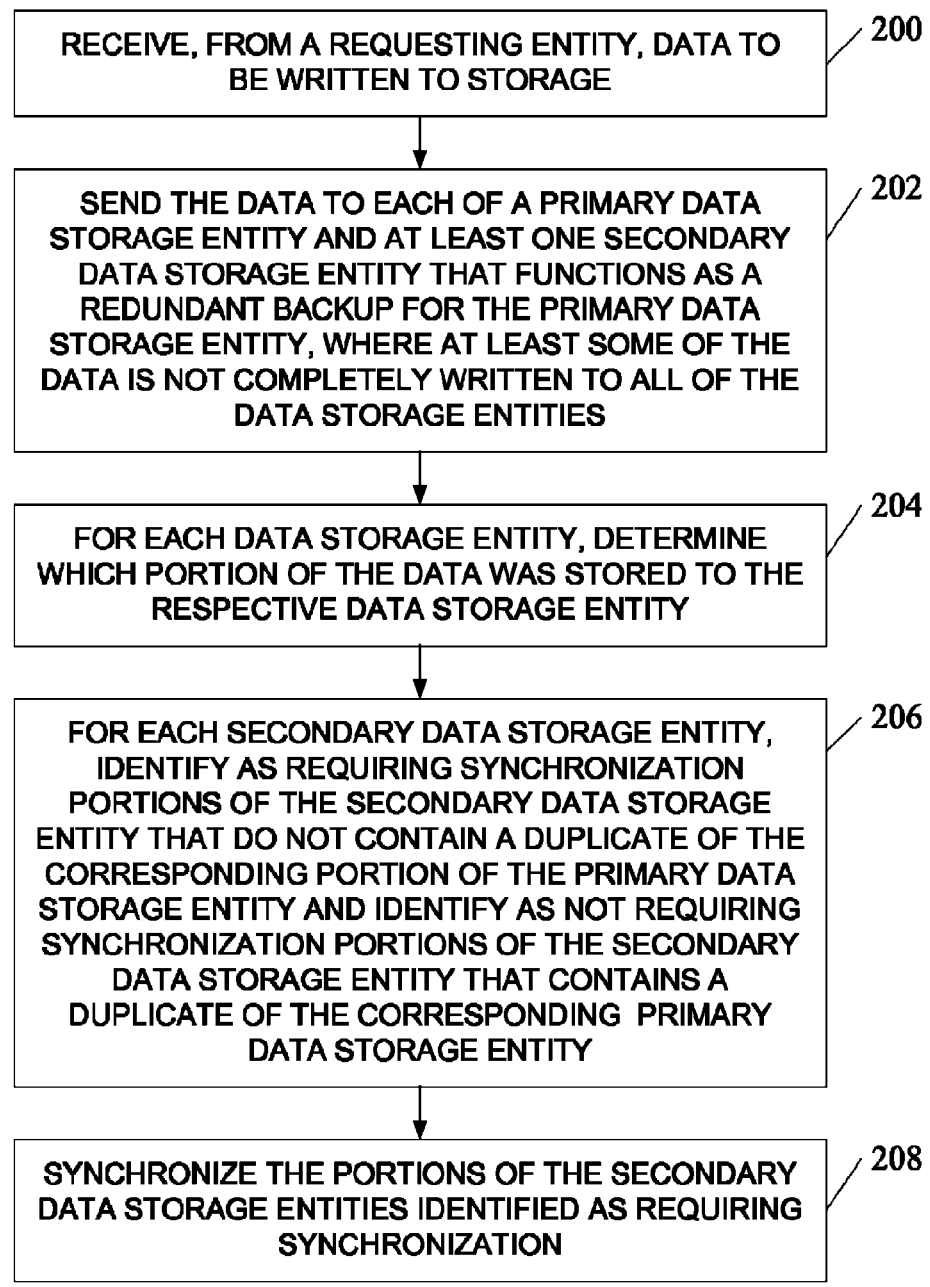
FIG. 2 is a flow chart illustrating an exemplary process for improving synchronization performance after partially completed writes according to an embodiment of the subject matter described herein.

FIG. 2 is a flow chart illustrating an exemplary process for improving synchronization performance after partially completed writes according to an embodiment of the subject matter described herein. At block 200, data to be written to storage is received from a requesting entity. For example, a data write request may be sent from a host. As mentioned above, the data to be written may be explicitly included in the write request, or it may be implicitly included, as in the case of a zero-fill write request.

At block 202, the data to be written is sent to each of a primary data storage entities and at least one secondary data storage entity that functions as a redundant backup for the primary data storage entity, where at least some of the data is not completely written to all of the data storage entities. For example, write controller 106 may issue separate write requests to each of primary 102, secondary 104A, and secondary 104B. In the embodiment illustrated in FIG. 1, write controller 106 may attempt to write data "ABCD" to all storage devices.

At block 204, for each of the plurality of data storage entities, it is determined which portion of the data was stored to the respective data storage entity. For example, primary 102 may indicate that data "AB" was stored, secondary 104A may indicate that data "A" was stored, and secondary 104B may indicate that data "ABC" was stored.

At block 206, for each secondary data storage entity, portions of the secondary data storage entity that do not contain a duplicate of the corresponding portion of the primary data storage entity are identified as requiring synchronization, and portions of the secondary data storage entity that do contain a duplicate of the corresponding portion of the primary data storage entity are identified as not requiring synchronization. For example, secondary 104A contains only data "A" while primary 102 contains data "AB". Thus, secondary 104A is out of sync with primary 102 with regards to portion "B". By similar analysis, write controller 106 can determine that portion "C" of secondary 104B is out of sync with primary 102.

At block 208, for each secondary data storage entity, data from the corresponding portion of the primary data storage entity is copied to each portion of the secondary data storage entity that has been identified as requiring synchronization. In this example, portion "B" will be copied from primary 102 to secondary 104A, and portion "Z" will be copied from primary 102 to portion "C" of secondary 104B.

Figure 3:
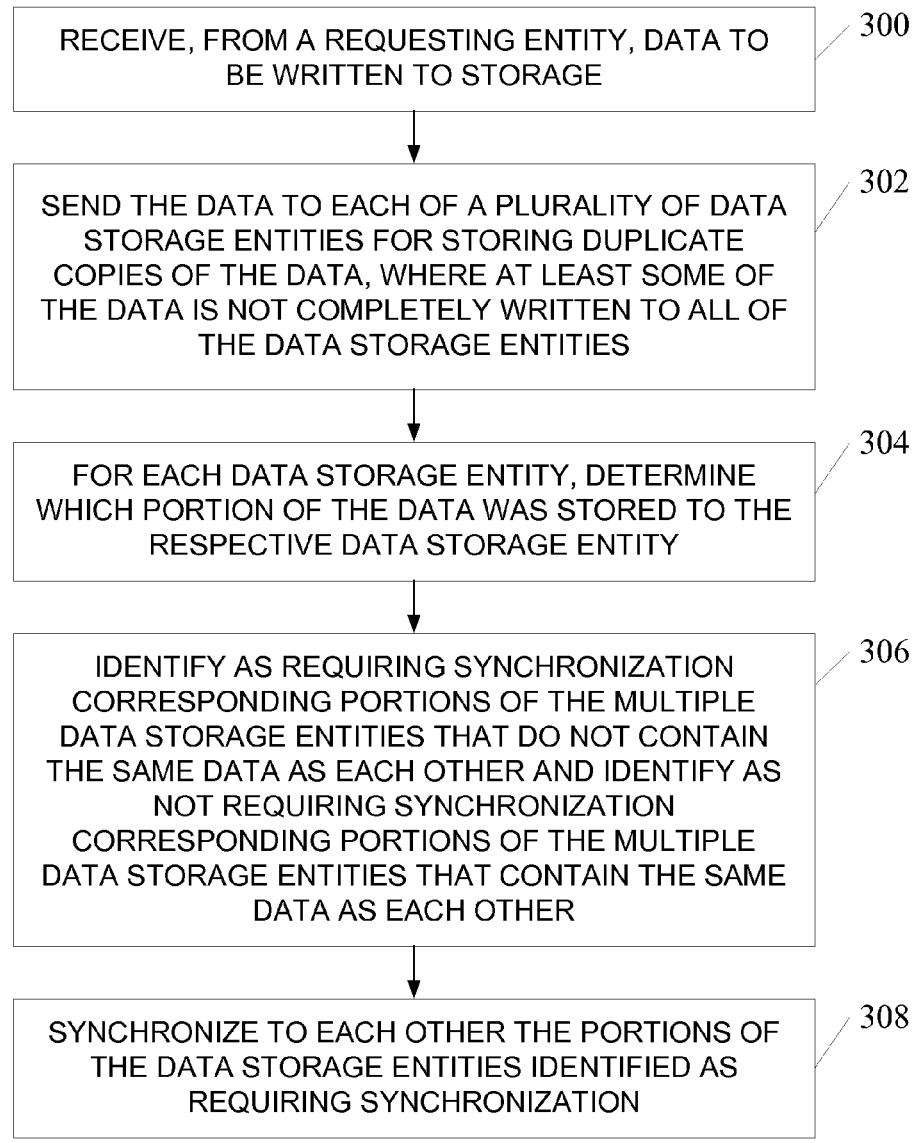
FIG. 3 is a flow chart illustrating an exemplary process for improving synchronization performance after partially completed writes according to another embodiment of the subject matter described herein.

FIG. 3 is a flow chart illustrating an exemplary process for improving synchronization performance after partially completed writes according to another embodiment of the subject matter described herein. In this embodiment, all data storage entities have equal authority over the others; there is no primary or secondary status, but the system is designed so that the data storage entities will be synchronized to whichever data storage entity is most successful during the partial write, e.g., receives the most data during a write attempt. A system implementing this method may look very much like the system describe in FIG. 1, except that all data storage entities (primary 102 and secondaries 104) would be treated the same. In one embodiment, all data storage entities would have their own bitmaps. In other words, primary 102 would also have a bitmap, although such a bitmap is not shown in FIG. 1.

At block 300, data to be written to storage is received from a requesting entity, and at block 302, the data to be written is sent to each of multiple data storage entities for storing duplicate copies of the data, where at least some of the data is not completely written to all of the data storage entities. At block 304, for each of the plurality of data storage entities, which portion of the data was stored to the respective data storage entity is determined.

At block 306, corresponding portions of the multiple data storage entities that do not contain the same data as each other are identified as requiring synchronization, and corresponding portions of the multiple data storage entities that do contain the same data as each other are identified as not requiring synchronization. In one embodiment, write attempts to each of the data storage entities would return indications of the level of success from each entity. For example, storage entity 102 (no longer a "primary") may again indicate that "AB" was written, and storage entities 104A and 104B (no longer "secondaries") may again indicate that "A" and "ABC" were written, respectively. In one embodiment, write controller 106 may determine which data storage entity was able to store the most data, data storage entity 104B in this example, determine that data storage entity 102 requires synchronization for portion C and that data storage entity 104A requires synchronization for portions B and C.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for improving synchronization performance after partially completed writes, the method comprising:
   receiving, from a requesting entity, data to be written to storage;
   sending all of the received data to each of a plurality of data storage entities, the plurality of data storage entities comprising a primary data storage entity and at least one secondary data storage entity that functions as a redundant backup for the primary data storage entity;
   determining that a write of at least some of the data was unsuccessful with regard to at least one of the data storage entities; and
   in response to determining that a write of at least some of the data was unsuccessful with regard to at least one of the data storage entities:
      determining, for each of the plurality of data storage entities, which portion of the data was stored to the respective data storage entity; and
      identifying as requiring synchronization as a result of the unsuccessful write portions of each of the at least one secondary data storage entity that do not contain a duplicate of the corresponding portion of the primary data storage entity, and identifying as not requiring synchronization portions of each of the at least one secondary data storage entity that contain a duplicate of a corresponding portion of the primary data storage entity.

2. The method of claim 1 comprising synchronizing the portions of the at least one secondary data storage entity identified as requiring synchronization.

3. The method of claim 2 wherein synchronizing the portions of the at least one secondary data storage entity comprises copying data from a portion of the primary data storage entity to the corresponding portion of the secondary data storage entity.

4. The method of claim 1 wherein identifying as requiring synchronization the portions of each of the at least one secondary data storage entity includes using a bitmap associated with a secondary data storage entity for indicating whether a portion of the respective secondary data storage entity is out of synchronization with the primary data storage entity, wherein each bit in the bitmap corresponds to a portion of the respective secondary data storage entity.

5. The method of claim 4 wherein a first value in the bitmap indicates that the corresponding portion of the secondary data storage entity is out of synchronization with the corresponding portion of the primary data storage entity, and wherein a second value in the bitmap indicates that the corresponding portion of the secondary data storage entity is synchronized with the corresponding portion of the primary data storage entity.

6. The method of claim 1 wherein receiving, from a requesting entity, data to be written to storage comprises receiving, from the requesting entity, a command that specifies a value, a sequence of values, or a pattern of values to be replicated throughout a specified portion of the data storage space.

7. The method of claim 6 wherein receiving the command comprises one of receiving a SCSI writesame command, receiving a data fill command, and receiving a zero fill command.

8. A method for improving synchronization performance after partially completed writes, the method comprising:
    receiving, from a requesting entity, data to be written to storage;
    sending all of the received data to each of a plurality of data storage entities for storing duplicate copies of the data;
    determining that a write of at least some of the data was unsuccessful with regard to at least one of the data storage entities;
    in response to determining that a write of at least some of the data was unsuccessful with regard to at least one of the data storage entities:
        determining, for each of the plurality of data storage entities, which portion of the data was stored to the respective data storage entity; and
        identifying as requiring synchronization as a result of the unsuccessful write corresponding portions of the plurality of data storage entities that do not contain the same data as each other and identifying as not requiring synchronization corresponding portions of the plurality of data storage entities that do contain the same data as each other.

9. The method of claim 8 comprising synchronizing to each other the portions of the data storage entities identified as requiring synchronization.

10. The method of claim 9 wherein synchronizing to each other the portions of the data storage entities identified as requiring synchronization comprises copying data from one data storage entity to the corresponding portion of another data storage entity until all data storage entities contain the same data.

11. The method of claim 10 wherein synchronizing to each other the portions of the data storage entities identified as requiring synchronization comprises identifying the data storage entity to which the most data was successfully written and copying data from the identified data storage entity to the other data storage entities.

12. The method of claim 9 wherein identifying as requiring synchronization the corresponding portions of the plurality of data storage entities that do not contain the same data as each other includes using bitmaps associated with each data storage entity for indicating the portions of the data that were stored to the respective data storage entity, wherein each bit in the bitmap corresponds to a portion of the respective data storage entity.

13. The method of claim 12 wherein a first value in a bitmap associated with a data storage entity indicates that the corresponding portion of the data was written to the respective data storage entity, and wherein a second value in the bitmap associated with the data storage entity indicates that the corresponding portion of the data was not written to the respective data storage entity.

14. The method of claim 13 wherein a portion of a data storage entity is identified as requiring synchronization when the value of the bit corresponding to the portion in the bitmap associated with the data storage entity does not match the value of the corresponding bit in the bitmap associated with another data storage entity.

15. The method of claim 8 wherein receiving, from a requesting entity, data to be written to storage comprises receiving, from the requesting entity, a command that specifies a value, a sequence of values, or a pattern of values to be replicated throughout a specified portion of the data storage space.

16. The method of claim 15 wherein receiving the command comprises one of receiving a SCSI writesame command, receiving a data fill command, and receiving a zero fill command.

17. A system for improving synchronization performance after partially completed writes, the system comprising:
    a primary data storage entity for storing data;
    a secondary data storage entity that functions as a redundant backup for the primary data storage entity; and
    a write controller, including a hardware processor, for:
        receiving, from a requesting entity, data to be written to storage;
        sending all of the received data to each of the primary and secondary data storage entities;
        determining that a write of at least some of the data was unsuccessful with regard to at least one of the data storage entities; and
        in response to determining that a write of at least some of the data was unsuccessful with regard to at least one of the data storage entities:
            determining, for each of the data storage entities, which portion of the data was stored to the respective data storage entity; and
            identifying as requiring synchronization as a result of the unsuccessful write portions of the secondary data storage entity that do not contain a duplicate of a corresponding portion of the primary data storage entity, and identifying as not requiring synchronization portions of the secondary data storage entity that contain a duplicate of a corresponding portion of the primary data storage entity.

18. The system of claim 17 wherein the write controller is configured to synchronize the portions of the secondary data storage entity identified as requiring synchronization.

19. The system of claim 17 wherein synchronizing the portions of the secondary data storage entity comprises copying data from at least one portion of the primary data storage entity to the corresponding at least one portion of the secondary data storage entity.

20. The system of claim 17 comprising a bitmap associated with each of the primary and secondary data storage entities, for indicating whether a portion of the respective secondary data storage entity is out of synchronization with the primary data storage entity, wherein each bit in the bitmap corresponds to a portion of the respective secondary data storage entity.

21. The system of claim 20 wherein a first value in the bitmap indicates that the corresponding portion of the secondary data storage entity is out of synchronization with the corresponding portion of the primary data storage entity, and wherein a second value in the bitmap indicates that the corresponding portion of the secondary data storage entity is synchronized with the corresponding portion of the primary data storage entity.

22. The system of claim 17 wherein the write controller is configured to receive, from a requesting entity, data to be written to storage by receiving, from the requesting entity, a command that specifies a value, a sequence of values, or a pattern of values to be replicated throughout a specified portion of the data storage space.

23. The system of claim 22 wherein the write controller is configured to receive one of a SCSI writesame command, a data fill command, and a zero fill command.

24. A computer readable medium having stored thereon computer-executable instructions that when executed by the processor of a computer perform steps comprising:
- receiving, from a requesting entity, data to be written to storage;
- sending all of the received data to each of a plurality of data storage entities, the plurality of data storage entities comprising a primary data storage entity and at least one secondary data storage entity that functions as a redundant backup for the primary data storage entity;
- determining that a write of at least some of the data was unsuccessful with regard to at least one of the data storage entities; and
- in response to determining that a write of at least some of the data was unsuccessful with regard to at least one of the data storage entities:
  - determining, for each of the plurality of data storage entities, which portion of the data was stored to the respective data storage entity; and
  - identifying as requiring synchronization as a result of the unsuccessful write portions of each of the at least one secondary data storage entity that do not contain a duplicate of a corresponding portion of the primary data storage entity, and identifying as not requiring synchronization portions of each of the at least one secondary data storage entity that contain a duplicate of a corresponding portion of the primary data storage entity.

* * * * *